United States Patent [19]
Duquette et al.

[11] 3,966,057

[45] June 29, 1976

[54] DRAFT GEAR MECHANISM AND METHOD OF ASSEMBLING SAME

[75] Inventors: Francis H. Duquette, Hinsdale; Walter H. Merker, Jr., Downers Grove, both of Ill.

[73] Assignee: Miner Enterprises, Inc., Chicago, Ill.

[22] Filed: Feb. 6, 1975

[21] Appl. No.: 547,692

[52] U.S. Cl. ............................... 213/22; 213/32 C; 267/63 R
[51] Int. Cl.² ............................................. B60G 9/06
[58] Field of Search ............... 267/63 R, 3; 213/32, 213/22, 40 R, 40 D, 45; 29/173, 522, 255; 264/229; 425/338

[56] References Cited
UNITED STATES PATENTS

| | | | |
|---|---|---|---|
| 2,764,300 | 9/1956 | Withall | 213/32 R |
| 2,817,445 | 12/1957 | Campbell | 213/32 R |
| 2,841,292 | 7/1958 | Campbell | 213/32 R |
| 3,202,300 | 8/1965 | Holm et al. | 213/32 R |
| 3,370,718 | 2/1968 | Waddell | 213/32 R |
| 3,708,075 | 1/1973 | Labelle | 213/32 R |

*Primary Examiner*—James B. Marbert
*Attorney, Agent, or Firm*—Darbo, Robertson & Vandenburgh

[57] ABSTRACT

An integral casing has a main body portion with an opening formed in one side thereof, a rear end closure wall, and a constricted front end section. Arranged within the casing are force transmitting means, a pad follower, and a stacked series of elastomeric resilient pad units. During assembly of the mechanism, a group of the resilient pad units are compressed and moved through the side opening into the body portion.

11 Claims, 6 Drawing Figures

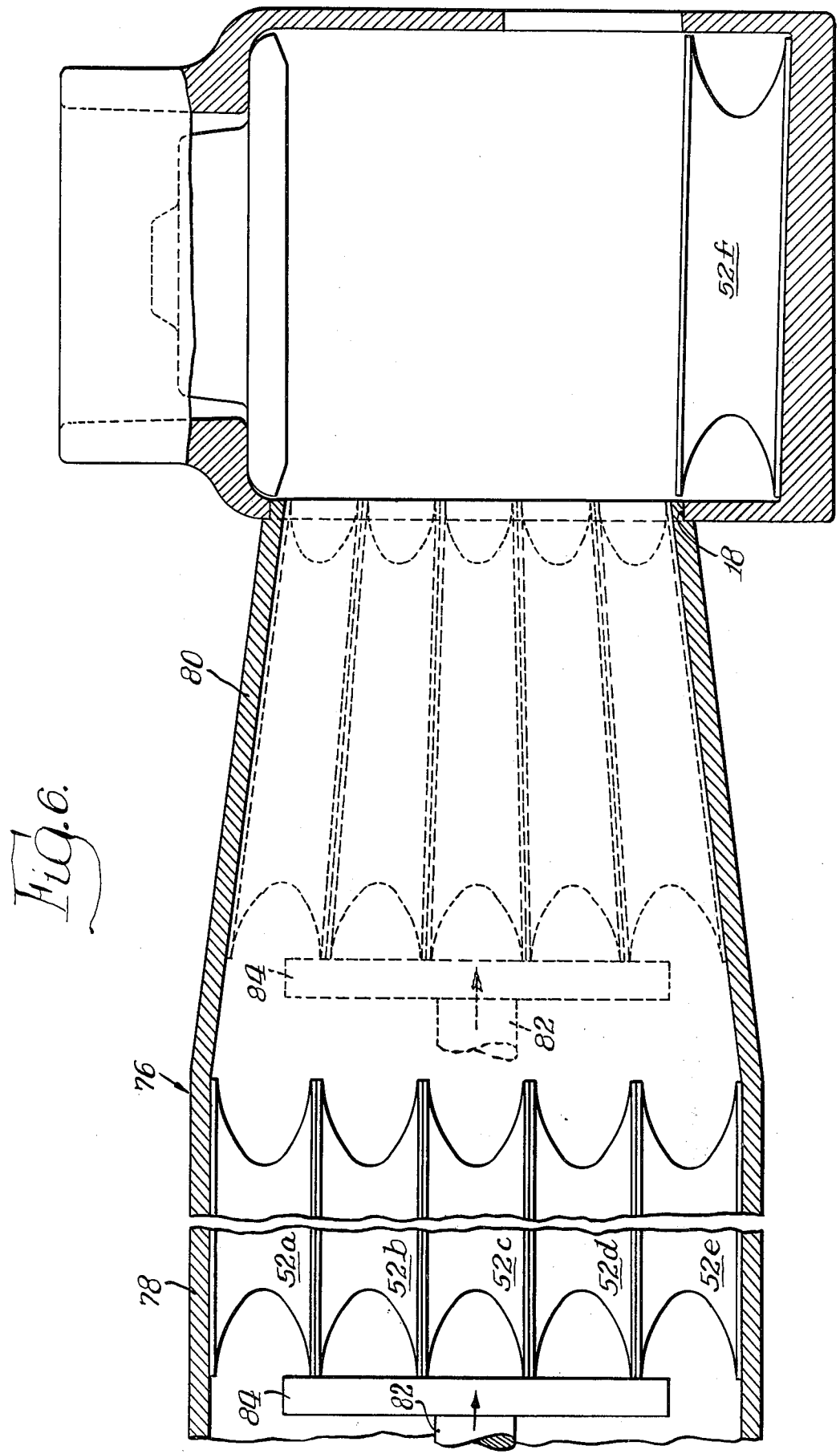

:

DRAFT GEAR MECHANISM AND METHOD OF ASSEMBLING SAME

BACKGROUND OF THE INVENTION

One commercially successful type of draft gear mechanism is shown in U.S. Pat. No. 2,764,300. This type of draft gear mechanism employs a friction wedge and friction shoes in conjunction with a pad follower and rubber pad units. The wedge and shoes are mounted within a front constricted friction bore section of a casing, while the follower and pad units are mounted within a larger main body portion of the casing. This arrangement offers a highly efficient shock absorber.

However, this prior art draft gear mechanism has one serious shortcoming. Because of the large size of the rubber pad units, they can not be assembled through the constricted front section, and a removable rear wall is provided so that the follower and rubber pad units may be assembled through the rear of the casing. The removable rear wall considerably impairs the integrity of the rear end of the casing and hence has a deleterious effect on the service life of the draft gear mechanism under heavy load conditions.

SUMMARY OF THE INVENTION

Like the prior art draft gear mechanism described above, the draft gear mechanism of the present invention utilizes a wedge and shoes mounted within a front constricted friction bore section of a casing, and a pad follower and pad units mounted within a larger main body portion of the casing. Accordingly, the mechanism of the present invention retains the highly efficient shock absorbing characteristics of the prior art.

Unlike the prior art draft gear mechanism described above, the draft gear mechanism of the present invention incorporates a casing having an integral rear end closure wall. By providing an integral rear wall in place of a removable rear wall, the integrity of the rear end of the casing is preserved, and the service life of the mechanism of the present invention is accordingly improved over that of the prior art.

To accommodate assembly of the draft gear mechanism of the present invention, an opening is formed in one side wall of the main body portion of the casing. During assembly of the mechanism, a group of the pad units are compressed and, while in compressed condition, moved sideways into the casing through the side opening.

BRIEF DESCRIPTION OF THE DRAWINGS

FIG. 6 is a view, partly in section and partly in elevation, illustrating another manner of assembly of the draft gear mechanism of the present invention.

DESCRIPTION OF THE PREFERRED EMBODIMENTS

Figure 1:
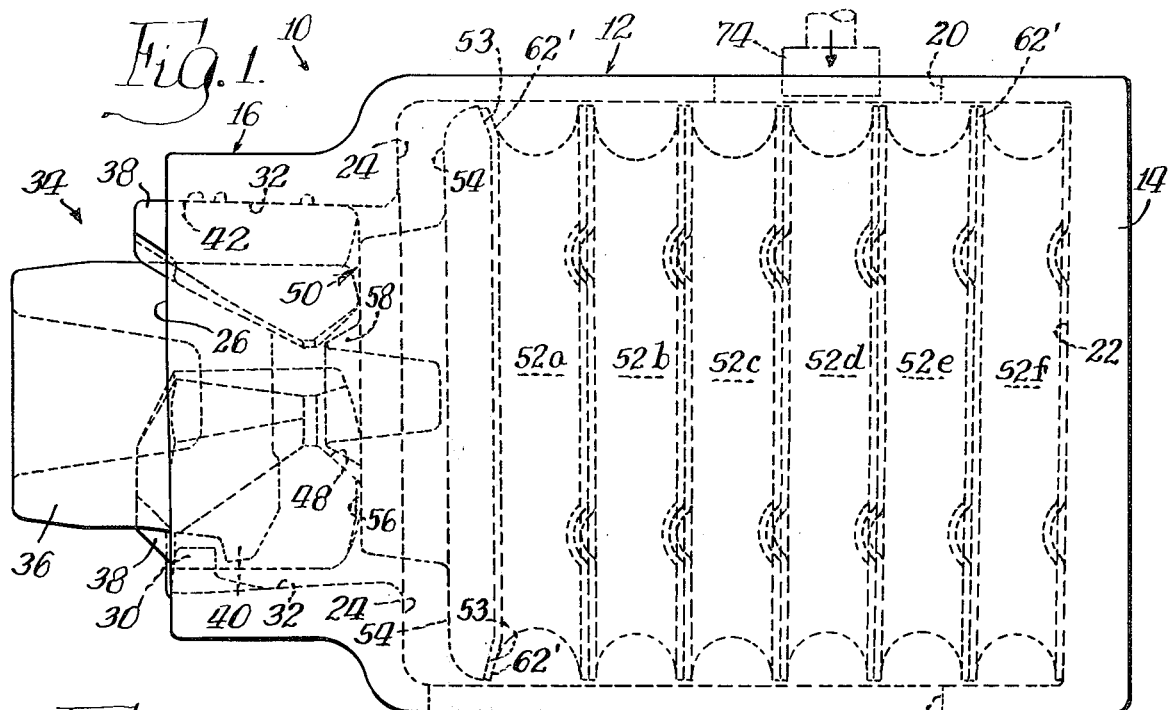
FIG. 1 is a plan view of the draft gear mechanism of the present invention.
Figure 2:
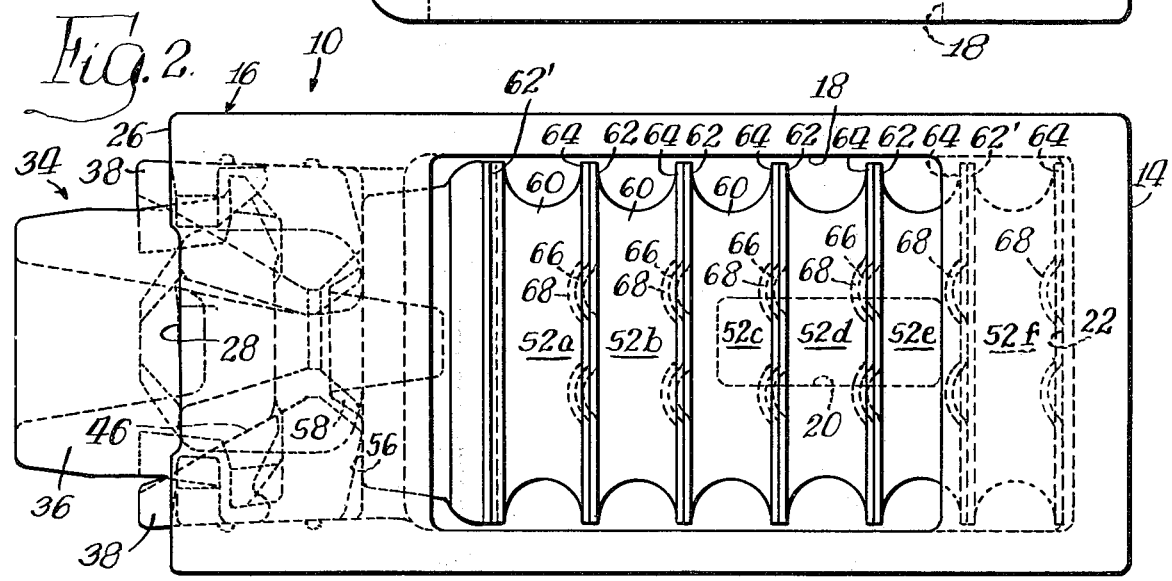
FIG. 2 is a side elevational view of the draft gear mechanism of FIG. 1.
Figure 3:
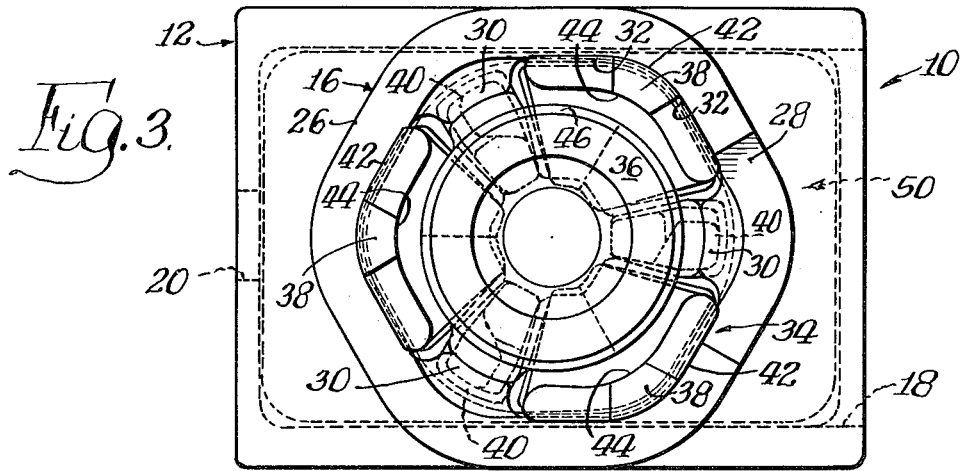
FIG. 3 is a front elevational view of the draft gear mechanism of FIG. 1.

As shown in FIGS. 1-3, the draft gear mechanism of the present invention comprises an integral housing or casing 10 having a main body portion 12 of rectangular cross section, a rear end closure wall 14, and a front end section 16 of hexagonal cross section. A relatively large rectangular opening 18 is formed in one side wall of the body portion 12, and a small rectangular opening 20 is formed in the opposed wall of the body portion 12. The inner surface 22 of the rear end wall 14 is provided with a slight slope of about 1 ¼° in a direction away from the large side opening 18. The junction of the body portion 12 and the front end section 16 defines interior shoulder means 24. The outer forward surface 26 of the front end section 16 is formed with an area 28 of about 60° extent depressed or recessed about 1/16 inch in line with the side opening 18. The front end section 16 is provided with radially inwardly directed lugs 30, and with tapered inner friction surfaces 32 that converge in a direction toward the rear end of the casing 10.

Arranged within and projecting from the front end section 16 is force transmitting or friction clutch means 34 comprised of a friction wedge 36 and three winglike friction shoes 38. The wedge 36 is provided with radially outwardly directed lugs 40 which are engaged behind the casing lugs 30 to restrain the wedge 36 and shoes 38 against movement outwardly of the casing 10. The friction shoes 38 include tapered outer friction surfaces 42 which have frictional engagement with the friction surfaces 32 of the casing 10, and tapered inner friction surfaces 44 which have frictional engagement with the tapered outer friction surface 46 of the wedge 36. Each friction shoe 38 is also provided with a rear inwardly facing partial conical surface 48.

Arranged within the rectangular body portion 12 of the casing 10 are a front pad follower 50 and a stacked series of individual compressible elastomeric resilient pad units 52a–52f. The follower 50 includes beveled face portions 53 along a pair of opposed edges, a first front surface 54, a second front surface 56 which abuts the inner faces or heel portions of the friction shoes 38, and a central truncated conical section 58 adapted for cooperation with the partial conical shoe surfaces 48 during assembly of the draft gear friction clutch mechanism. Each resilient pad unit 52a–52f comprises a radially and cantenarically shaped elastomer pad 60 interposed between and bonded to a pair of metal plates 62 or 62' and 64. In addition, the plates 62 of the pad units 52b–52e are provided with centering projections 66, while the plates 64 of the pad units 52a–52f are provided with cooperating centering seats 68 of which only those in pad units 52a–52d are used while those in pad units 52e and 52f appear only for convenience of manufacture and assembly interchangeability.

Figure 4:
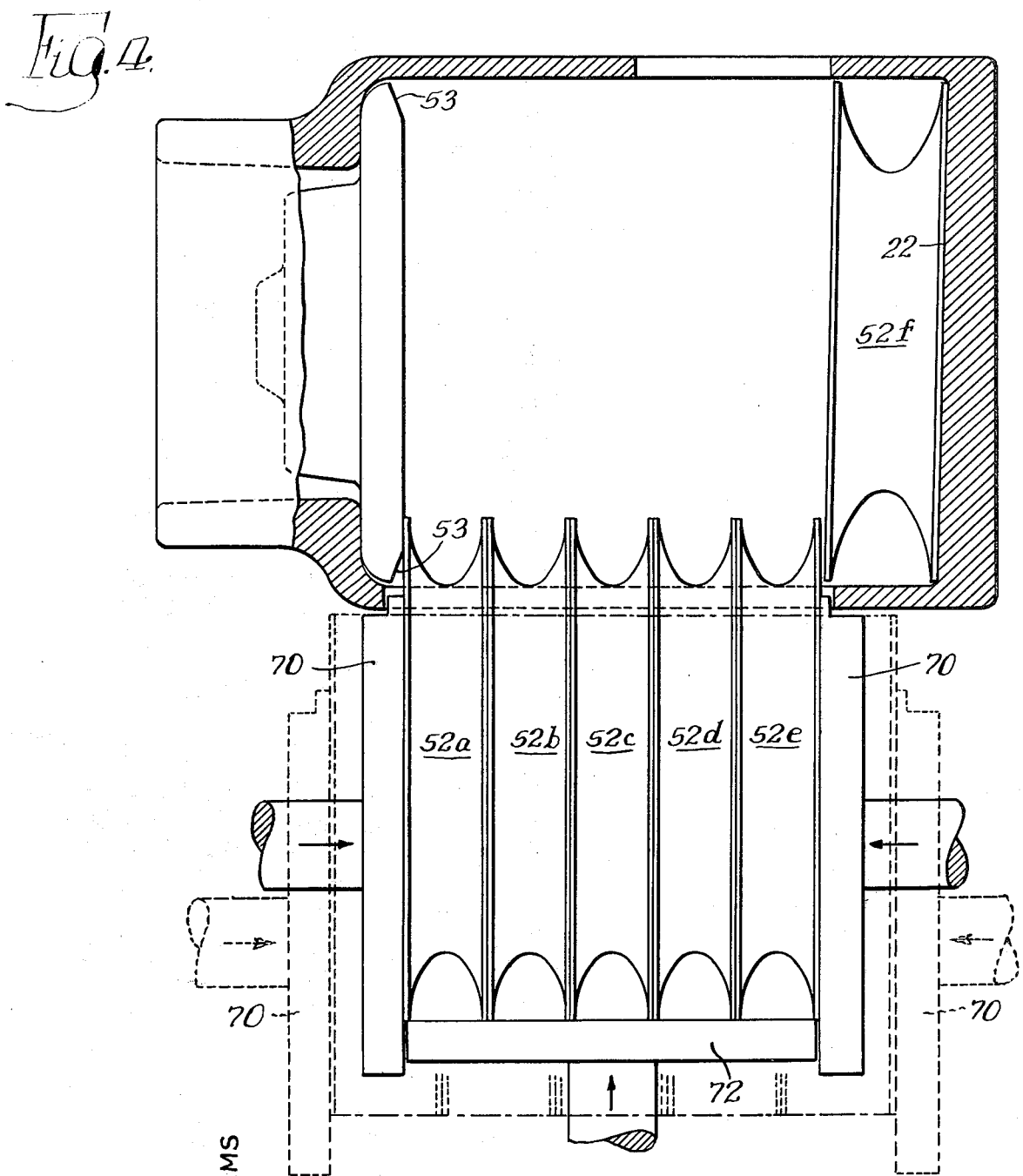
FIG. 4 is a view, partly in section and partly in elevation, illustrating one manner of assembly of the draft gear mechanism of the present invention.
Figure 5:
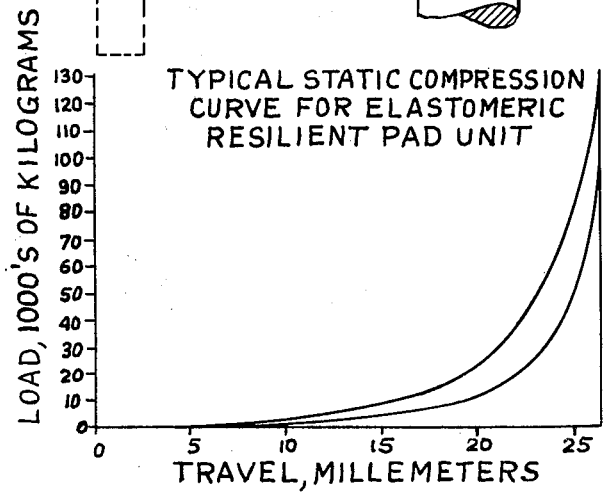
FIG. 5 shows a typical static compression curve for an elastomeric resilient pad unit.

To assemble the mechanism, the follower 50 and the rearwardmost base pad unit 52f are first placed in the casing 10—that is, inserted through the large side opening 18—as shown in FIG. 4. Next, the group of pad units 52a–52e are placed in a fixture and compressed between jaws 70 from their normal overall height shown in dotted lines to the height shown in solid lines. At this point, the jaws 70 and compressed pad units 52a–52e are shifted toward the casing 10 to introduce the edges of the jaws 70 into the opening 18. Finally, the compressed pad units 52a–52e are pushed from between the jaws 70 through the opening 18 into the casing 10 by a ram 72. As the compressed pad units move into the casing 10, they expand and tightly fill the interior thereof. At the same time, as shown in FIG. 1, the base pad unit 52f is partially compressed thus permitting the plate 64 of the pad unit 52e to move beyond the adjacent side edge of the opening 18, and the plate 62' of the pad unit 52a blends slightly along its short edges to partially conform to the beveled face portions 53 of the follower 50 with complete bending and conformation occurring in use of the draft gear mechanism during the first full travel of the wedge 36. These conditions, together with the interengaged centering projections 66 and centering seats 68, the sloped rear wall surface 22, and the greater inherent pad column stability with the opening 18 perpendicular to the longitudinal axis of the pad column, serve to retain the follower 50 and pad units 52a–52f in proper alignment within the casing 10. Preferably, the shoes 38 and the wedge 36 are then inserted in a conventional manner through the front end of the casing 10. Alternatively, the shoes 38 and the wedge 36 may be positioned in place prior to insertion of the follower 50 and the pad units 52a–52e. However, in this event, the first front surface 54 of the follower 50 is prevented from abutting the casing shoulder means 24 thereby requiring a considerably greater pressure on the jaws 70 to attain the necessary additional deflection per pad unit as may be observed from the typical non-linear load-deflection curve shown in FIG. 5.

Another method of compressing the pad units 52a–52e and moving them into the casing 10 is shown in FIG. 6. In lieu of the compression fixture shown in FIG. 4, there is provided a hopper 76, of rectangular cross section, having a mouth section 78 and a tapered throat section 80. During assembly, the edges of the throat section 80 are first inserted in the opening 18. Then, the pad units 52a–52e, in a free height condition, are placed in the mouth section 78. Finally, the pad units 52a–52e are pushed through the hopper 76 into the casing 10 by a ram 82 having a telescopic head 84. As the pad units 52a–52e are forced through the throat section 80, they are compressed from their normal free height to the necessary reduced height for entry into the casing 10. Since the pad units 52a–52e are compressed in the lower range of the load-deflection curve shown in FIG. 5, the throat section 80 requires only a few degrees of slope.

As an alternative to compressing the pad units 52a–52e and forcing them into the casing 10 in the manner described above, these pad units may be compressed, frozen in a compressed condition for example by dry ice, and simply inserted without force through the opening 18 into the casing 10 while frozen. Upon thawing, the pad units will expand and assume the positions shown in FIG. 1.

Operationally, when impact forces are imposed on the draft gear mechanism, the wedge 36 is moved relatively inwardly of the casing 10 and effects simultaneous longitudinal and radial inward movement of the friction shoes 38. Concurrently, the pad units 52a–52f resist such movement of the friction shoes 38. This compound action serves to cushion, and dissipate a portion of, the impact forces. During full stroke or oversolid usage, the depressed area 28 at the outer forward surface 26 of the front end section 16 described above prevents an external force-applying member from contacting and loading the least strong side of the casing 10 in which the opening 18 is formed. By providing the inner surface 22 of the rear end wall 14 with a slight slope as noted above, the pad units 52a–52f are constantly urged away from the opening 18 thus preventing accidental disassembly of the draft gear mechanism or undesirable pad column buckling. Should it be desired to disassemble the mechanism, a ram 74 (FIG. 1) may be entered through the opening 20 for forcing one of the pad units laterally outwardly through the side opening 18, after which the remaining loosely-spaced components may be conveniently withdrawn from the interior of the casing 10.

While there have been shown and described preferred embodiments of the present invention, it will be understood by those skilled in the art that various rearrangements and modifications may be made therein without departing from the spirit and scope of the invention.

What is claimed is:

1. A draft gear mechanism comprising an integral casing having a main body portion and a rear end closure wall and a constructed front end section, force transmitting means within and projecting from said front end section, a front pad follower within said body portion and abutting said force transmitting means, a stacked series of individual compressible elastomeric resilient pad units within said body portion between said front pad follower and said rear end closure wall, and an opening formed in one side wall of said body portion through which a compressed group of said pad units may be moved into said body portion during assembly of said mechanism, the inner surface of said rear end closure wall having a slight slope in a direction away from said opening thereby urging said stacked series of pad units away from said opening.

2. A draft gear mechanism comprising an integral casing having a main body portion and a rear end closure wall and a constricted front end section, force transmitting means within and projecting from said front end section, a front pad follower within said body portion and abutting said force transmitting means, a stacked series of individual compressible elastomeric resilient pad units within said body portion between said front pad follower and said rear end closure wall, and an opening formed in one side wall of said body portion through which a compressed group of said pad units may be moved into said body portion during assembly of said mechanism, the outer forward surface of said front end section being formed with a recessed area in line with said opening to prevent an external force-applying member from contacting and loading the side of said casing in which said opening is formed.

3. A draft gear mechanism comprising an integral casing having a main body portion and a rear end closure wall and a constricted front end section, force transmitting means within and projecting from said front end section, a front pad follower within said body portion and abutting said force transmitting means, a stacked series of individual compressible elastomeric resilient pad units within said body portion between said front pad follower and said rear end closure wall, and an opening formed in one side wall of said body portion through which a compressed group of said pad units may be moved into said body portion during assembly of said mechanism, said force transmitting means comprising a friction wedge, and a plurality of friction shoes each provided with a rear inwardly facing partial conical surface, said front pad follower comprising a central truncated conical section adapted for cooperation with said partial conical surfaces during assembly of said friction shoes in conjunction with said pad follower.

4. A draft gear mechanism comprising an integral casing having a main body portion and a rear end closure wall and a constricted front end section, force transmitting means within and projecting from said front end section, a front pad follower within said body portion and abutting said force transmitting means, a stacked series of individual compressible elastomeric resilient pad units within said body portion between said front pad follower and said rear end closure wall, and an opening formed in one side wall of said body portion through which a compressed group of said pad units may be moved into said body portion during assembly of said mechanism, each of said pad units comprising an elastomer pad interposed between and bonded to a pair of metal plates, said pad follower including beveled face portions along a pair of opposed edges, the plate of said pad unit adjacent said follower in assembled relation bending along its edges to conform to said beveled face portions of said follower.

5. The draft gear mechanism of claim 4 wherein said group of said pad units are provided with cooperating centering projections and seats, and wherein the rear plate of the read pad unit of said group of pad units in assembled relation lies beyond the adjacent side edge of said opening.

6. The draft gear mechanism of claim 4 wherein the outer metal plates of said group of said pad units have flat exposed surfaces prior to assembly into said body portion to facilitate movement of said group of said pad units into said body portion during assembly.

7. The draft gear mechanism of claim 1 wherein a second opening is formed in the side wall of said body portion opposite said one side wall through which an implement may be entered for forcing one of said pad units laterally outwardly through said opening in said one side wall in connection with disassembly of said mechanism.

8. The method of assembling a draft gear mechanism having a casing with an opening in one side thereof, comprising the steps of:
   at a location external of said casing, forming a group of elastomeric resilient pad units,
   applying a compressive force to said group of elastomeric resilient pad units to reduce the normal overall width of the latter, and
   thereafter moving said group of pad units through said opening into said casing.

9. The method of claim 8 wherein said compressive force is applied at said location, and said group of pad units are forced from said location through said opening into said casing while said force is applied thereto.

10. The method of claim 8 including the step of freezing said group of pad units in a compressed condition at said location, and wherein said group of pad units are inserted through said opening into said casing while frozen.

11. The method of claim 8 wherein said step of applying a compressive force is effected by forcing said group of said pad units through a tapered throat configuration.

* * * * *

UNITED STATES PATENT AND TRADEMARK OFFICE
CERTIFICATE OF CORRECTION

PATENT NO. : 3,966,057
DATED : June 29, 1976
INVENTOR(S) : Francis H. Duquette et al It is certified that error appears in the above-identified patent and that said Letters Patent are hereby corrected as shown below:

Column 4, line 22, "constructed" should read --constricted--.

Column 5, line 28, "read" should read --rear--.

Signed and Sealed this

Twenty-sixth Day of October 1976

[SEAL]

Attest:

RUTH C. MASON
Attesting Officer

C. MARSHALL DANN
Commissioner of Patents and Trademarks